United States Patent [19]

Brown

[11] Patent Number: 5,470,441
[45] Date of Patent: Nov. 28, 1995

[54] PACKED COLUMN VAPORIZER AND VAPORIZING PROCESS

[75] Inventor: Ronald E. Brown, Bartlesville, Okla.

[73] Assignee: Phillips Petroleum Company, Bartlesville, Okla.

[21] Appl. No.: 207,435

[22] Filed: Mar. 7, 1994

[51] Int. Cl.⁶ .............................. B01D 3/14; B01D 47/16
[52] U.S. Cl. .................... 203/49; 203/2; 203/92; 203/96; 203/99; 203/DIG. 22; 202/158; 202/234; 202/267.1; 208/48 AA; 261/96; 261/97; 261/DIG. 65; 261/DIG. 72; 261/DIG. 76; 422/211
[58] Field of Search ................... 203/99, 49, 96, 203/92, DIG. 22, 2; 202/158, 267.1, 234; 261/97, DIG. 72, 96, DIG. 65, DIG. 76; 165/115, 47; 585/648; 422/210, 211; 208/48 AA

[56] References Cited

U.S. PATENT DOCUMENTS

| | | | |
|---|---|---|---|
| 3,446,489 | 5/1969 | Leva | 261/97 |
| 3,448,038 | 6/1969 | Pall et al. | 261/97 |
| 3,453,412 | 7/1969 | Walwark et al. | 219/271 |
| 4,333,894 | 6/1982 | Hoppe et al. | 261/DIG. 72 |
| 4,692,234 | 9/1987 | Porter et al. | 208/48 AA |
| 4,839,108 | 6/1989 | Silvey | 202/158 |
| 4,924,936 | 5/1990 | McKown | 165/47 |
| 5,013,407 | 5/1991 | Nocca et al. | 202/158 |
| 5,034,103 | 7/1991 | Hamer et al. | 202/158 |
| 5,262,094 | 11/1993 | Chuang et al. | 261/97 |
| 5,284,994 | 2/1994 | Brown et al. | 585/648 |

Primary Examiner—Wilbur Bascomb, Jr.
Attorney, Agent, or Firm—K. K. Brandes

[57] ABSTRACT

An apparatus for vaporizing volatile liquids comprises a packed column, a gas inlet port (for introducing a hot entrainer gas), a feed tube (for introducing a volatile liquid), a feed distributor comprising a base plate equipped with orifices (through which the liquid flows downward into the packed column) and risers (through which the formed gaseous mixture of entrainer gas and vaporized liquid flows upward), and a gas outlet port. This apparatus can be used to vaporize volatile liquids, preferably volatile tin compounds, optionally in admixture with volatile silicon compounds, wherein steam is used as the entrainer gas.

20 Claims, 3 Drawing Sheets

PACKED COLUMN VAPORIZER AND VAPORIZING PROCESS

BACKGROUND OF THE INVENTION

In one aspect, this invention relates to an apparatus designed to vaporize volatile liquids. In another aspect, this invention relates to the use of an apparatus for vaporizing volatile liquids, in particular, liquids which are effective as antifoulants in reactors for thermal cracking of hydrocarbons.

A multiple, parallel packed column vaporizer for vaporizing volatile chemicals is disclosed in U.S. Pat. No. 4,924,936. This vaporizer requires external heating means surrounding the multiple columns. The vaporizer of the present invention is an advance in the art in that it comprises a single packed column and requires no external heating means surrounding the column. These features of the present invention result in reduced costs for manufacturing and operating the apparatus, as compared with the prior art vaporizer. The vaporizer of this invention is particularly useful for vaporizing organic tin compounds and other volatile compounds which are effective as antifoulants in thermal alkane (e.g., ethane cracking) reactors.

SUMMARY OF THE INVENTION

It is an object of this invention to provide a packed column vaporizer which requires no external heating means surrounding the packed column. It is another object if this invention to use this vaporizer for vaporizing volatile compounds. It is a further object of this invention to use this vaporizer for vaporizing organic tin compounds. Other objects and advantages become apparent from the detailed description of this invention, including the drawings, and the appended claims.

In accordance with this invention, an apparatus for vaporizing volatile liquid materials comprises (preferably consists essentially of): (a) a packed column containing a bed of substantially inert, solid particles; (b) a gas inlet port being located below said bed of solid particles; (c) a liquid feed tube (i.e., a tube for introducing a liquid feed) having a plurality of downwardly-directed holes, said tube being located above said bed of solid particles; (d) a feed distributor comprising a plate, a plurality of orifices extending through said plate and a plurality of open riser tubes mounted on said plate, said plate being located between the top of said packed column and said liquid feed tube; and (e) a gas outlet port being located above said feed tube. No external heating means surrounding said packed column are present.

Also in accordance with this invention, a process for vaporizing a volatile liquid substance comprises: (1) providing an apparatus comprising parts (a), (b), (c), (d) and (e), as described above; (2) introducing a hot entrainer gas (also referred to as carrier gas) through said gas inlet port; (3) establishing an upward flow of said hot entrainer gas in said packed column; (4) introducing a volatile liquid through said liquid feed tube and forcing said volatile liquid to flow through said multiple downwardly-directed holes onto said plate of said feed distributor; (5) forcing said volatile liquid to flow through said orifices into said packed column; (6) forming a gaseous mixture of said hot entrainer gas and of vaporized liquid and in said packed column; and (7) forcing said gaseous mixture to flow upward through said plurality of open riser tubes, and to exit through said gas outlet port.

Preferably, the hot entrainer gas is steam, and the volatile liquid is a tin-containing compound (more preferably an organic tin compound).

DETAILED DESCRIPTION OF THE INVENTION

The solid packing particles used in the packed column section of the vaporizer of this invention can be any of the well known, generally commercially available packing particles, such as Raschig rings, Pall rings, saddles, and structured packings. Generally, the size (length, width) of these particles is in the 0.5–3 inch range. These particles are generally made of a substantially inert material (i.e., chemically resistant to the entrainer gas such as steam and to the vaporized liquid feed under the operating conditions of the vaporizer), such as stainless steel, ceramic compositions, and the like.

The diameter and the height of the packed column section of the vaporizer depend on the throughput (volume of liquid feed and of entrainer gas per hour). In commercial operations, these packed columns generally have an inner diameter of about 0.3–2 feet and a height of about 2–15 feet. The outer walls of the column, as well as all other pertinent parts of the vaporizer, are generally made of stainless steel. The wall thickness, as well as the thickness of all other pertinent parts of the vaporizer, are such as to safely withstand the operating pressure in the vaporizer (with a built-in safety factor of about 2–5). Generally, the column wall thickness is about 0.2–0.8 inch. The column walls, as well as all other pertinent parts of the vaporizer exposed to the outside environment, are thermally insulated by any suitable means, e.g., by wrapping them with fiberglass mats, so as to minimize the heat-exchange between the interior of the entire vaporizer and the outside environment. It is a unique feature of the vaporizer of this invention that no external heating means are needed. Essentially the entire heat content required for the operation of the vaporizer is provided by the hot entrainer gas, preferably steam.

Figure 1:
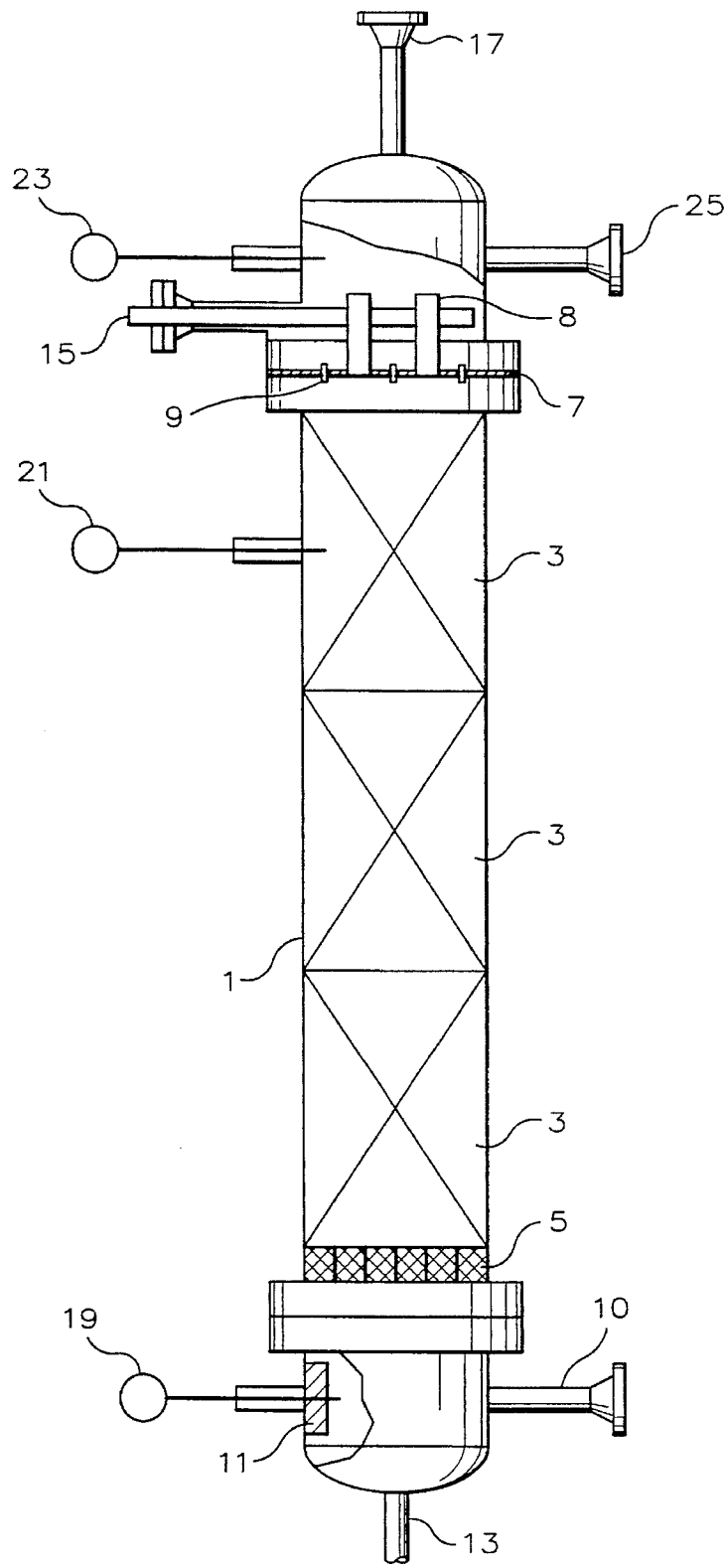
FIG. 1 gives an elevated view of the vaporizer of this invention.

As is indicated in FIG. 1, the various inlet and outlet tubes (b), (c) and (e) are connected by means of flanges, (fastened in a customary manner with nuts and bolts) to the central portions of the vaporizer (i.e., the packed column and the various sections above and below the packed column), as is common practice in the field of mechanical engineering. Also various gauges (in particular pressure and temperature gauges) are generally connected to the vaporizer in the above-described manner.

Figure 2:
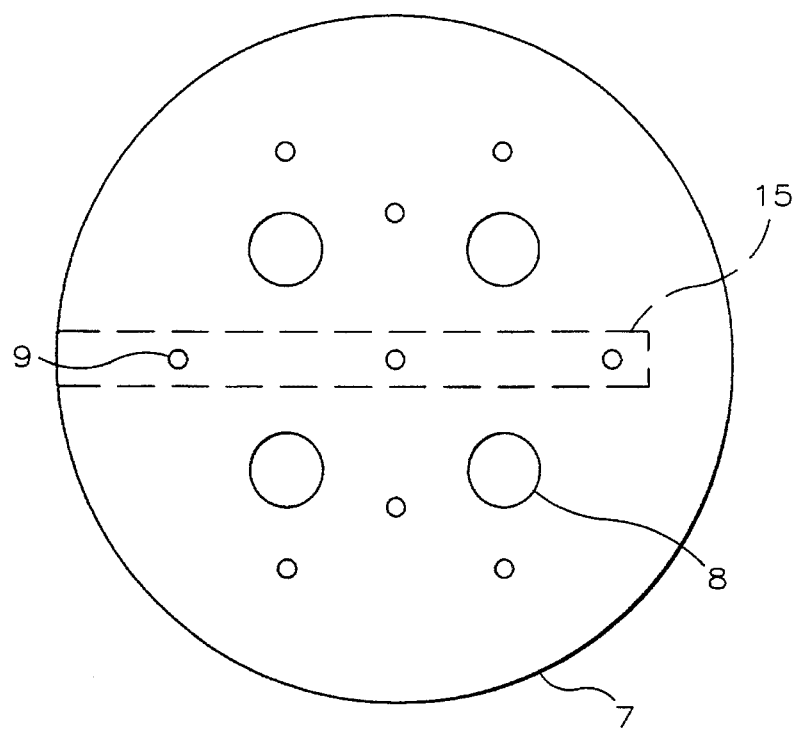
FIG. 2 gives a top view of a feed distributor employed in the vaporizer of this invention.
Figure 3:
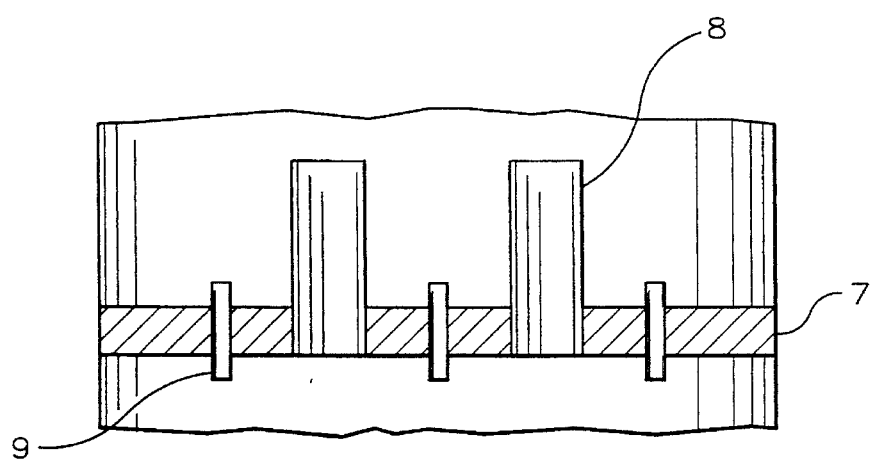
FIG. 3 gives a side view of a feed distributor employed in the vaporizer of this invention.

A unique component of the vaporizer of this invention is a feed distributor. The components of this distributor are a base plate, a plurality of chimney-like risers and a plurality of orifices, as is shown in FIG. 2 and FIG. 3. The distributor plate is located between the packed column and the feed inlet tube. The risers (also referred to as open riser tubes;

total number: preferably about 3–6) generally have an inner diameter of about 1–4 inches and a height (above the plate) of about 4–8 inches. The orifices (total number: preferably about 7–12) are considerably smaller in diameter than the risers and generally have an inner diameter of about 0.1–0.5 inch. Generally, these orifices are small steel tubes which extend through the distributor plate at a height of about 0.2–2 inches above the distributor plate and about 0.2–2 inches below the distributor plate.

The feed inlet tube (inner diameter: generally about 0.2–2 inches) extends nearly completely across the vaporizer column and has a plurality of small, downwardly directed holes (total number: about 4–8; hole diameter: about 0.06–0.25 inch). The liquid feed is pumped at a suitable rate through the inlet tube and forced through these holes onto the distributor plate. The liquid feed rate is controlled by the difference of the liquid feed pump pressure and the pressure in the interior of the vaporizer immediately above the distributor plate. In a commercial operation, the liquid feed rate is generally about 5–50 gallons per/hour. The liquid feed is forced through the holes in the feed tube and accumulates on the distributor plate. Once the level of the liquid layer which has accumulated on the plate reaches the upper rim of the orifices, the liquid starts flowing through these orifices onto the solid packing.

The downward flowing liquid feed is met in the packed column section of the vaporizer by the hot entrainer gas stream (generally steam) which has been introduced through the gas inlet part (generally at a rate of about 500–5,000 lb. per hour) and has been flowing upward through the packed column. Generally, the entrainer gas when it enters the vaporizer through the inlet port has a temperature in the range of about 300° F. to about 600° F. and a pressure of about 40–200 psig. During its upward path, the hot entrainer gas is substantially uniformly distributed throughout the column. The hot entrainer gas, which generally has a temperature of about 300°–500° F. and a pressure of about 40–200 psig in the upper portion of the packed column, causes the liquid feed to substantially vaporize. The formed gaseous mixture (entrainer gas and vaporized feed) then flows upward through the risers and eventually out of the outlet port. Non-vaporized liquid feed which is present in the packed column is retained therein by the distributor plate until it is vaporized. Eventually the entire liquid feed is vaporized. The pressure differentials in this part of the vaporizer are such that the liquid feed can flow through the holes in the feed tube and the orifices of the distributor, and the vapor stream can flow upward through the risers. Temperature and pressure conditions in the various parts of the vaporizer can be easily controlled and monitored by persons skilled in the art, so as to attain a smooth, effective operation.

Any suitable volatile liquid can be used as the liquid feed. Generally, the volatile liquid has a normal boiling point (i.e., a boiling point measured at an atmospheric pressure of 1 arm.) in the range of about 70° F. to about 700° F., preferably about 200°–600° F. Presently preferred feeds are tin-containing compounds which are effective antifoulants for reducing the formation of coke and carbon monoxide in light hydrocarbon pyrolysis (thermal cracking) reactors. These volatile tin-containing compounds, which are employed as antifoulants (either alone or in combination with other volatile compounds, e.g., compounds of Sb, Si, Ge, Ti, Al, Ga, In, P, Cr, Cu and the like), are described in the patent literature, such as U.S. Pat. No. 4,404,087, 4,507,196, 4,545,893, 4,551,227, 4,552,643, 4,666,583, 4,687,567, 4,692,234, 5,015,358 and 5,284,994. Non-limiting examples of suitable tin-containing compounds include (but are not limited to) tetrahydrocarbyltin compounds, in particular tetraethyltin, tetrapropyltin, tetra-n-butyltin (presently preferred), tetraisobutyltin, tetrapentayltin compounds, tetrahexyltin compounds, tetraheptyltin compounds, tetraoctyltin compounds, tetraphyenyltin, and the like.

If a second volatile compound is employed in conjunction with a volatile tin compound, this second volatile compound preferably is a silicon compound, such as triethyl silane, tetraethyl silane, tripropyl silane, tetrapropyl silane, n-butyltrimethyl silane, di-n-butyl silane, diisobutyl silane, tri-n-butyl silane, triisobutyl silane, tetra-n-butyl silane, tetraisobutyl silane, various pentyl-, hexyl-, heptyl- and octyl-substituted silanes, phenyl silane, di- and triphenyl silanes, phenyltrimethyl silane, tetramethyl disiloxane, tetraethyl disiloxane, hexamethyl disiloxane, polysiloxanes, and other organic silicon compounds disclosed in U.S. Pat. No. 4,692,234. A presently preferred volatile silicon compound is hexamethyl disiloxane.

The feed rates of volatile tin compound(s) and the entrainer gas (preferably steam) are generally chosen so as to form a gaseous product (exiting the vaporizer) which contains about 0.2–2 weight-% tin (on an elemental basis). If a second volatile compound (preferably a silicon compound) is to be concurrently vaporized with the tin compound, the formed gaseous product contains about 0.2–2 weight-% tin (on an elemental basis) and about 0.05–1 weight-% of silicon (on an elemental basis). The obtained exiting product, preferably containing a tin compound or a combination of tin and silicon compounds, can be employed as an antifoulant agent (to reduce coke and CO formation) in a thermal hydrocarbon cracking operation (e.g., a thermal ethane cracker having metal walls, as is well known and has been described in U.S. Pat. No. 5,284,994). This gaseous product containing Sn compound(s), optionally in combination with Si compound(s), and steam can be injected into a commercial steamdiluted hydrocarbon cracker, at an injection rate such as to provide effective levels of tin and, optionally also silicon, in the ethanesteam cracker feed (generally about 1–200 ppm tin, and if applicable, about 1–100 ppm silicon).

The following examples are provided to further illustrate the processes of this invention, and are not to be construed as unduly limiting the scope of this invention.

Example I

This example illustrates a preferred embodiment of the vaporizer of this invention (shown in FIG. 1–3) and its operation for vaporizing volatile liquids.

A packed column 1, the walls of which are thermally insulated, contains a bed 3 of packing material (preferably stainless steel Pall rings having a diameter of about 1½ inch). The packed bed 3 is supported by a stainless steel ring 5 equipped with stainless steel bars. A stainless steel feed distributor, which comprises a base plate 7, about four open riser tubes 8 and about nine orifices 9, is installed above the packing by means of a flange connection. The diameter of the distributor plate 7 is about 16 inches; the riser tubes have a diameter of about 2.5 inches and a height of about 6 inches; and the orifices have a diameter of about 0.25 inch and a height of about 0.5 inch.

A gas inlet tube 10 for a hot entrainer gas (preferably steam) is located below the packed bed. An impingement plate 11 (made of stainless steel) is installed opposite to the entrainer gas inlet tube 10 (so as to aid in the distribution of the hot gas on its upward path through the packed bed).

Preferably, when steam is used as the hot entrainer gas, a drip tube 13 is installed at the bottom of the vaporizer so that water (formed by condensation of some of the injected steam) can drain.

Figure 4:
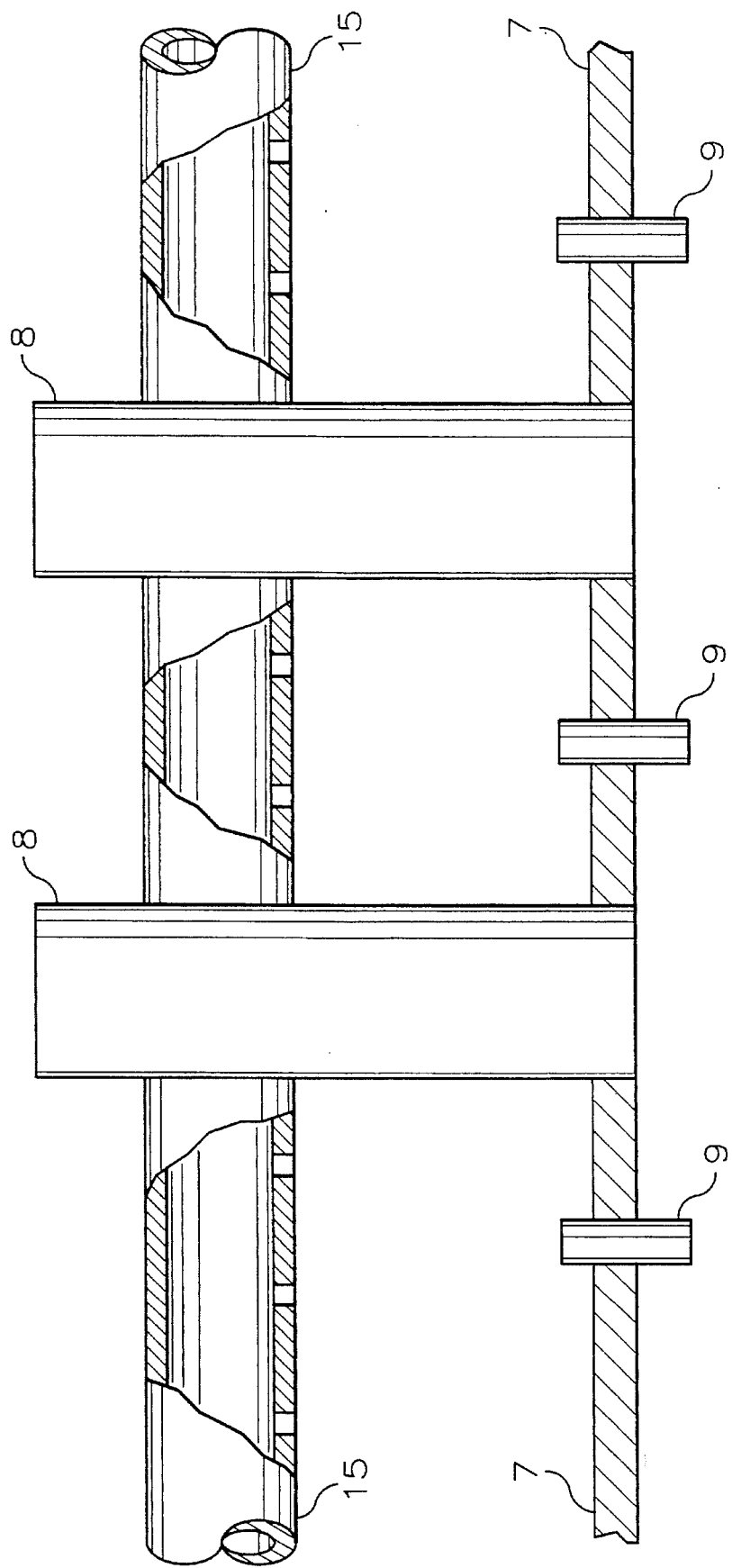
FIG. 4 gives an enlarged fragmentary view of the upper portion of the vaporizer of FIG. 1, with sections of feed tube 15 broken away to show downwardly-directed holes therein.

A liquid feed to be vaporized is pumped through liquid feed tube 15 which has a plurality of downwardly-directed holes (see FIG. 4) and is located below the tops of the risers and above the tops of the orifices of the distributor plate. The liquid feed accumulates on the base of the distributor plate until it reaches the top of the orifices. Then the liquid flows through the orifices into the packed column. The hot, well distributed entrainer gas (which has passed through the packed column) vaporizes the liquid feed (which has dripped downward into the packed bed). The formed gaseous product (entrainer gas and vaporized liquid feed) passes upward through riser tubes 8 and exits through outlet port 17.

Several temperature and pressure gauges (19, 21 and 23) are installed in various parts of the vaporizer so as to monitor the vaporization process. A pressure safety valve 25 is provided which can be actuated (so as to allow gases to escape when there is an excessive pressure buildup inside the vaporizer). Not shown in the figures are the feed pump for the liquid feed (generally a gear meter pump) and the compressor/heater for generating the hot entrainer gas (generally a centrifugal pump). As can be determined by those skilled in the art, one or more suitable support brackets (not shown in the figures) are generally installed to securely anchor the vaporizer to an external support base (not shown in the figures). Pressure and temperature conditions in the various parts of the vaporizer and the flow rates of the entrainer gas and liquid feed depend on the volatility (boiling point) of the feed and the desired concentration of the vaporized feed in the gaseous product exiting the vaporizer. These parameters can be determined by those skilled in the art without undue experimentation.

Example II

This example describes test results obtained from a pilot plant vaporizer, which is a simplified, scaled-down version of the vaporizer of this invention.

A packed column (containing 0.25 inch diameter stainless steel ProPak saddles) having a diameter of about 2 inches and a height of about 6 feet was used as the simulated vaporizer. Steam which had been pressurized to 100 psig and heated to 339° F. was introduced at a rate of 2.3 lb/hour through a side inlet located below the packing. Liquid tetrabutyltin (TBT; normal boiling point: 576° F.) was introduced at a pressure of 120 psig and a feed rate of 24 cc/hour through a feed tube which extended halfway across the column above the packing. The upward flow of steam caused the liquid TBT to evaporate, and a gaseous mixture of steam and TBT exited the column through an outlet located above the liquid feed inlet tube. The exiting gaseous (vapor) mixture had a temperature of 340° F. and a pressure of 97.5 psig, and was cooled by means of a heat exchanger employing cold water. Samples of the condensed mixture (i.e., liquid water and liquid TBT) were collected in glass bottles. The TBT was extracted from each condensed mixture with chloroform, and the obtained extracts were analyzed for their TBT content by evaporating the chloroform and weighing the TBT residue. Test results are summarized in Table I.

TABLE I

| Test Run | Test Period (minutes) | Wt. (g) of Injected TBT Feed | Wt. (g) of TBT in Condensed Product | % TBT Recovery |
| --- | --- | --- | --- | --- |
| 1 | 20 | 8.37 | 0.83 | 9.90 |
| 2 | 50 | 20.92 | 18.45 | 88.20 |
| 3 | 50 | 20.92 | 20.49 | 97.90 |
| 4 | 50 | 20.92 | 20.43 | 97.70 |
| 5 | 100 | 0.00 | 7.13 | — |
| Total | | 71.13 | 67.33 | 94.70 |

Test results in Table I clearly show that, after a steady state operation had been attained (after about 1 hour), about 98% of injected TBT was recovered in the condensed product. During the entire test series (lasting 270 minutes), the total TBT recovery was about 95%.

Reasonable variations, modifications and adaptations for various conditions can be made within the scope of the disclosure and the appended claims without departing from the scope of this invention.

That which is claimed is:

1. An apparatus for vaporizing volatile liquid materials comprising: (a) a packed column containing a bed of substantially inert, solid particles; (b) a gas inlet port being located below said bed of solid particles; (c) a liquid feed tube having a plurality of downwardly-directed holes, said tube being located above said bed of solid particles; (d) a feed distributor comprising a plate, a plurality of orifices extending through said plate and a plurality of open riser tubes mounted on said plate, said plate being located between the top of said packed column and said liquid feed tube; and (e) a gas outlet port being located above said feed tube.

2. An apparatus in accordance with claim 1, wherein no external heating means surround said packed column.

3. An apparatus in accordance with claim 1, wherein the number of said open riser tubes is about 3–6 and the number of said orifices is about 7–12.

4. An apparatus in accordance with claim 3, wherein said open riser tubes have an inner diameter of about 1–4 inches and a height above the distributor plate of about 4–8 inches, and said orifices have an inner diameter of about 0.1–0.5 inch and extend through the distributor plate at a height of about 0.2–2 inches above and below the distributor plate.

5. An apparatus in accordance with claim 1, wherein said packed column is thermally insulated and has an inner diameter of about 0.3–2 feet and a height of about 2–15 feet.

6. A process for vaporizing a volatile liquid substance which comprises:

(1) providing an apparatus comprising (a) a packed column containing a bed of substantially inert, solid particles; (b) a gas inlet port being located below said bed of inert solid particles; (c) a liquid feed tube having a plurality of downwardly-directed holes, said tube being located above said bed of solid particles; (d) a feed distributor comprising a plate, a plurality of orifices extending through said plate and a plurality of open riser tubes mounted on said plate, said plate being located between the top of said packed column and said liquid feed tube; and (e) a gas outlet port being located above said feed tube:

(2) introducing a hot entrainer gas through said gas inlet port;

(3) establishing an upward flow of said hot entrainer gas in said packed column;

(4) introducing a volatile liquid through said liquid feed tube and forcing said volatile liquid to flow through said multiple downward-directed holes onto said distributor plate;

(5) forcing said volatile liquid to flow through said orifices into said packed column;

(6) vaporizing said volatile liquid and forming a gaseous mixture of said hot entrainer gas and of vaporized liquid in said packed column; and (7) forcing said gaseous mixture to flow upward through said plurality of open riser tubes and to exit through said gas outlet port.

7. A process in accordance with claim 6, wherein no external heating means surround packed column (a).

8. A process in accordance with claim 6, wherein said hot entrainer gas is steam.

9. A process in accordance with claim 8, wherein said volatile liquid is at least one tin compound having a normal boiling point of about 200°–600° F.

10. A process in accordance with claim 9, wherein said at least one tin compound is at least one tetrahydrocarbyltin.

11. A process in accordance with claim 10, wherein said at least one tetrahydrocarbyltin is tetra-n-butyltin.

12. A process in accordance with claim 8, wherein said volatile liquid additionally comprises at least one silicon compound having a normal boiling point of about 200°–600° F.

13. A process in accordance with claim 12, wherein said at least one silicon compound is hexamethyl disiloxane.

14. A process in accordance with claim 6, wherein said hot entrainer gas is steam, no external heating means surround said packed column (a), said volatile liquid is at least one tin compound having a normal boiling point of about 200°–600° F., and said gaseous mixture exiting through said gas outlet port contains about 0.2–2 weight-% tin.

15. A process in accordance with claim 14, wherein said volatile liquid additionally comprises at least one silicon compound having a normal boiling point of about 200°–600° F., and said gaseous mixture exiting through said gas outlet port additionally contains about 0.05–1 weight-% silicon.

16. A process in accordance with claim 6, wherein said hot entrainer gas is steam having a temperature of about 300°–500° F. and a pressure of about 40–200 psig.

17. A process in accordance with claim 16, wherein steam is introduced through said gas inlet port at a rate of about 500–5,000 lb. per hour.

18. A process in accordance with claim 16, wherein said volatile liquid has a normal boiling point of about 200°–600° F. and is introduced through said liquid feed tube at a rate of about 5–50 gallons per hour.

19. A process in accordance with claim 6, wherein the number of said open riser tubes is about 3–6, the number of said orifices is about 7–12, said open riser tubes have an inner diameter of about 1–4 inches and a height above the distributor plate of about 4–8 inches, and said orifices have an inner diameter of about 0.1–0.5 inch and extend through the distributor plate at a height of about 0.2–2 inches above and below the distributor plate.

20. A process in accordance with claim 6, wherein said packed column is thermally insulated and has an inner diameter of about 0.3–2 feet and a height of about 2–15 feet.

* * * * *